United States Patent [19]

Fry

[11] 4,223,902

[45] Sep. 23, 1980

[54] VEHICLE SUSPENSION

[75] Inventor: Timothy S. Fry, Dunchurch, England

[73] Assignee: GKN Group Services Limited, Warley, England

[21] Appl. No.: 7,937

[22] Filed: Jan. 31, 1979

[30] Foreign Application Priority Data

Feb. 15, 1978 [GB] United Kingdom ............... 5937/78

[51] Int. Cl.³ .............................................. B62D 7/16
[52] U.S. Cl. ....................................... 280/96; 280/691
[58] Field of Search ................. 280/691, 660, 96, 661, 280/95 R, 93

[56] References Cited

U.S. PATENT DOCUMENTS

| 1,350,451 | 8/1920 | Guth | 280/96 |
| 3,666,036 | 5/1972 | Scerbo | 280/660 X |

FOREIGN PATENT DOCUMENTS 1134115  4/1957  France ................... 280/660

Primary Examiner—John J. Love
Assistant Examiner—Norman L. Stack
Attorney, Agent, or Firm—Merriam, Marshall & Bicknell

[57] ABSTRACT

A steerable wheel mounting assembly of a vehicle, with a steerable element mounted relative to a non-steerable element, e.g. an axle beam, by bearings located wholly below the rotary axis of a wheel hub carried by the steerable element, the latter being steered by a link connected to it below such axis and the bearings lubricated from the lubricant supply of the hub.

4 Claims, 3 Drawing Figures

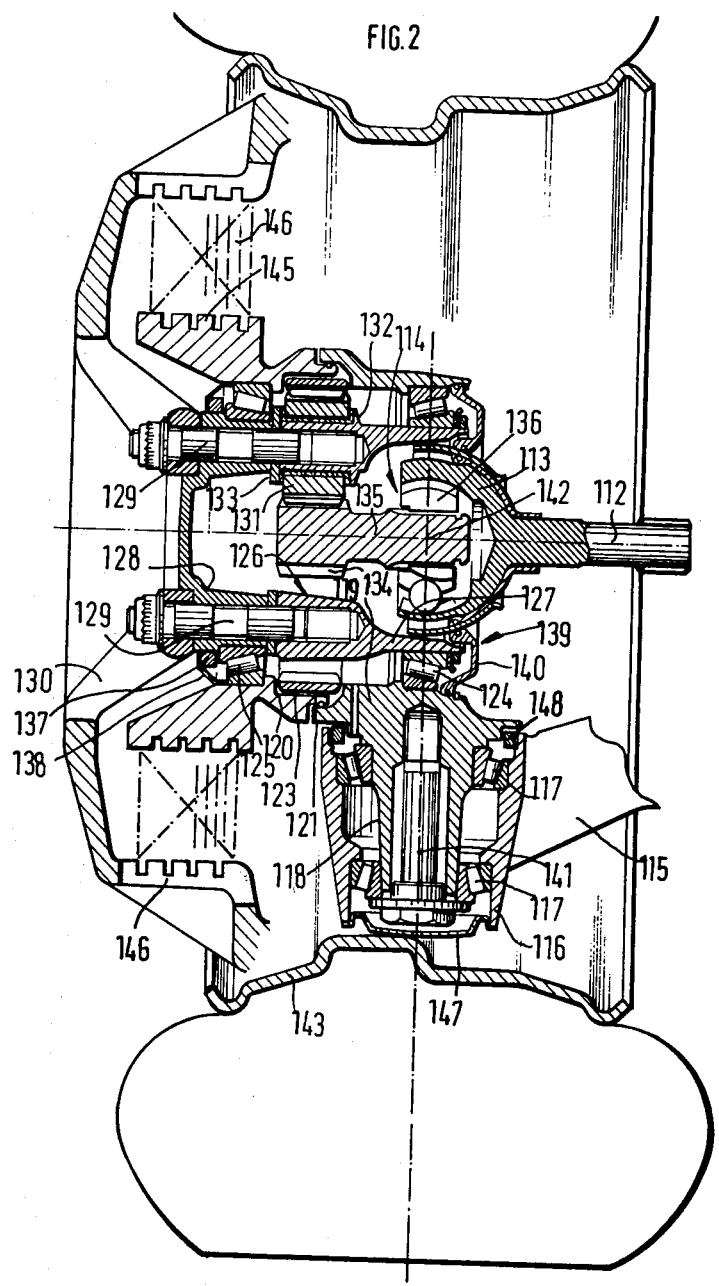

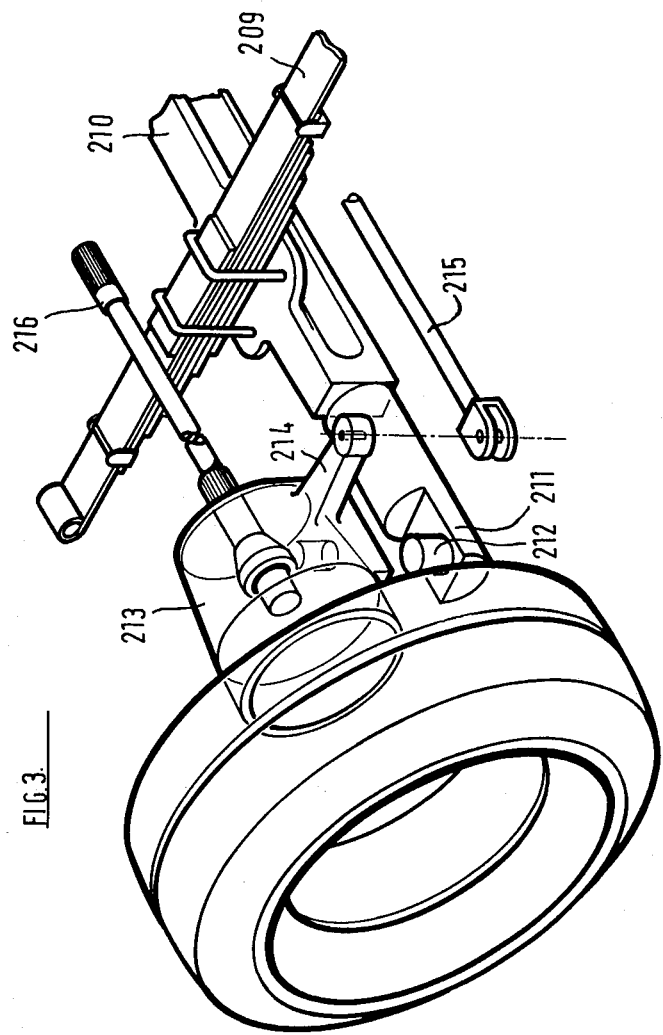

VEHICLE SUSPENSION

BACKGROUND OF THE INVENTION

Field of the Invention

This invention relates to the mounting of steerable, ground engaging, wheels for vehicles. While not limited thereto, the invention has been developed in relation to rigid steerable axles for large commercial vehicles in which the developed forces are high, the invention also being applicable to independently sprung wheels.

The braking and cornering forces applied to a steerable wheel are transmitted to its mounting, and the forces applied to the mounting are a function of the forces applied to the wheel and of the distance between the area of engagement of the wheel with the ground and the mounting. It has been proposed to reduce the forces applied to the mounting by arranging the bearing which mounts the steerable wheel for steering movement below the axis of rotation of the wheel, thereby reducing the moment arm of the forces. It is an object of the present invention to provide improvements in such mountings.

SUMMARY OF THE INVENTION

According to the invention, we provide a mounting assembly for a steerable wheel, comprising a non-steerable element arranged to be supported on a vehicle (normally via springing means), a steerable element supporting, by bearing means, a rotatable hub arranged to carry a ground engaging wheel, a link member connected to said steerable element for applying steering movement to the latter from a steering mechanism, and further bearing means, hereinafter referred to as steering bearing means, between said elements and mounting said steerable element on said non-steerable element for pivotal steering movement, said steering bearing means being located wholly below the rotary axis of the hub when the assembly is in an in-use position and being the sole bearing means between said elements, said link member being connected to said steerable element below said rotary axis. Said steerable element and rotatable hub may define an enclosure containing lubricant for said bearing means, there being means providing for supply of lubricant from said enclosure to said steering bearing means.

The combination of the first bearing means and the link member both being disposed below the axis of rotation of the hub means that not only are the loads due to braking and cornering on the bearing means reduced as compared with conventional practice where there are swivel bearings above and below the rotary axis of the hub, but steering forces imposed on the steerable element act at a position closer to the area of contact between the wheel and ground. In addition, the connection of the steering link member to the steerable element below such axis renders it unnecessary to provide an attachment point on the steerable element above such axis, enabling the steerable element to be more compact.

Hitherto, it has been usual to provide for lubrication of steering swivel bearings by means of grease charged into such bearings. Such grease eventually degrades, but the bearing may only be re-charged with lubricant at very infrequent intervals. The disposition of the steering bearing means beneath the axis of rotation of the hub means that such bearings can be supplied with lubricant, e.g. oil, from the main supply for the hub bearings, ensuring a constant and adequate supply of lubricant to the steering bearing means and thereby improved working conditions therefore.

The non-steerable element may be a rigid axle, in which case a wheel mounting assembly will be provided at each end thereof.

The axis about which the steering bearing means provides for pivotal steering movement preferably intersects the ground within the area of contact of the tyre, carried by the wheel, with the ground, and preferably at the centre plane of the wheel. This gives centre point steering, thus reducing the turning moments applied by the wheel reactions to the steering mechanism.

The preferred arrangement where centre point steering is provided may be compared with steerable axles where the steering swivel bearings are located above and below the rotary axes of the ground engaging wheels. Loads applied to the axle parts during the steering are applied at contact patches between the tyres and ground and have considerable moments about the swivel bearings tending to turn the wheels. So long as the steerable wheels are interconnected and the loads on the wheels are substantially equal and opposite, steering is satisfactory. If, however, the loads on a pair of steerable wheels become unequal, for example if one of the wheels suffers a blow-out, the vehicle may become out of control with the steering wheel being snatched out of the drivers hands by the unbalanced forces. Even if the loads applied by the wheels are substantially equal, and opposite but the wheels themselves are out of rotational balance, the fore and aft moments applied during rotation of the wheels can cause the wheels to oscillate about their swivel axes. In addition, if the swivel axes are at large inclinations to the vertical, steering causes the vertical movement of the axle relative to the ground. All these factors cause large loads to be applied at the swivel bearings as compared with the arrangement of the present invention.

BRIEF DESCRIPTION OF DRAWINGS

The invention will now be described by way of example with reference to the accompanying diagrammatic drawings, in which:

FIG. 2 is a section through a wheel mounting assembly.

FIG. 3 is a perspective view of a further wheel mounting assembly embodying the invention.

DESCRIPTION OF PREFERRED EMBODIMENTS

Figure 1:
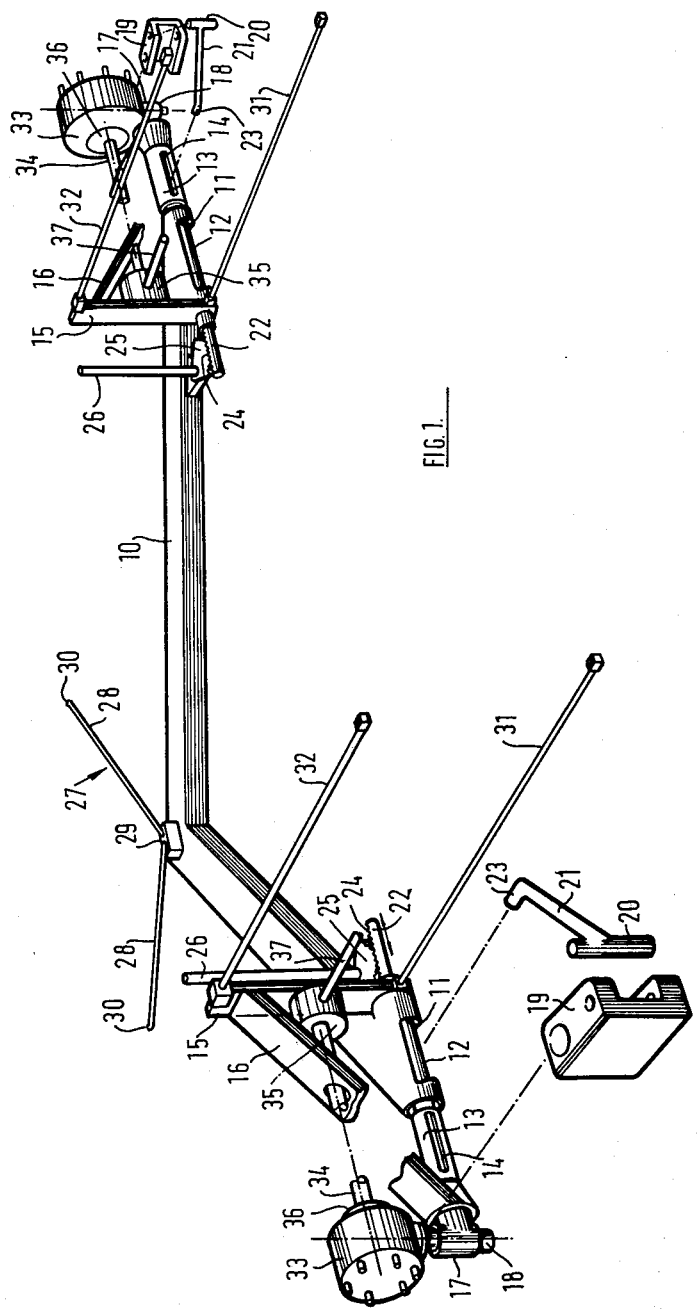
FIG. 1 is a perspective view of an axle assembly embodying the invention.

Referring firstly to FIG. 1, there is shown an axle assembly which comprises an axle beam 10 of V-shape having, at its end, aligned bores 11 which contain bearings. The bores are slotted at 12 and are arranged to extend transversely of the vehicle.

Received in the bearings in each bore 11 is a spindle 13, each spindle being slotted at 14 and being hollow. FIG. 1 shows the spindles 13 exploded outwardly from bores 11. It should be understood that when operatively assembled spindles 13 will be positioned in bores 11, and that slots 14 will coincide with slots 12. The inner end of each spindle is connected to a vertical link 15 and a triangulating arm 16 extends from the outer end of the spindle to the link 15. At its outer end, each spindle has a bush 17 in which is received a king pin 18. Link 15, arm 16 and bush 17 together can be considered a nonsteerable element. Bush 17, however, is also a steering bearing means. Spindle 13 mounts the nonsteerable element on the axle beam for pivotal movement of the non-steerable element about an axis extending transversely of the vehicle. In FIG. 1, this axis is the axis of the spindle 13. Mounted on the king pin 18 at each end of the axle is a channel-section steering arm 19. The trailing end of the arm 19 is connected to a pin 20 at the outer end of a track rod 21. The inner ends 23 of the track rods pass through the slots 12 at the ends of the axle beam and through the slots 14 in the spindles 13. Slidable within the bore in each spindle 13 is a steering control rod 22 and to these control rods are pivoted the inner ends 23 of the track rods 21. Transverse movement of the steering control rods 22 will cause steering movement of the steering arms 19 via the track rods. One way of moving the control rods 22 is by forming them as racks at 24 and engaging these racks with separate quadrants 25 driven by shafts 26 journalled in lugs on the axle beam. By having separate control rods 22, a space is provided between the inner ends thereof to give clearance, for example, to an engine or other items of equipment on the vehicle. If desired, however, the control rods 22 could be connected or formed as a single rod controlled by a single quadrant. Instead of quadrants, pinions could be used or levers could be provided on the ends of the control rods connected via ball joints to control means.

The axle assembly is located by a V-shaped link 27 having arms 28 connected together at an apex 29 which is connected via a universal joint to the apex of the axle beam 10. The other ends 30 of the V-shaped link are connected via universal joints to parts of the vehicle chassis. The link thus locates the axle beam transversely of the vehicle. In addition, there are upper and lower radius rods on each side. Thus there are lower radius rods 31 which are connected via universal joints to the lower end of the links 15 adjacent to the spindles 13. The radius rods 31 are connected either to the links 15 or to the ends of the axle beams via universal joints at locations adjacent to the spindles. The upper radius rods are indicated at 32 and are connected via universal joints to the upper ends of the arms 16, in the present example via the links 15. The links 15 could be ommitted in which case the rods 32 would be connected directly to the arms 16. The radius rods control the pitch centre of the axle assembly and take torque reaction from braking.

Mounted on each king pin 18 is a driven hub 33. King pin 18 and driven hub 33 together can be considered a steerable element. Track rod 21 is operatively connected to the steerable element by arm 19. Each hub is driven via a shaft 34. Each shaft extends between the hub 33 and a bevel gearbox 35 mounted on a link 15. There is a steering joint 36 at the outer end of each shaft. The shafts 34 pass through holes in the arms 16.

The hubs may include epicyclic hub reduction gears, and will carry road wheels. The bevel gearboxes 35 are driven via longitudinal shafts indicated at 37, or the gearboxes 35 could be ommitted and the hubs driven by shafts whose inner ends are connected to a differential final drive mechanism.

It will be noted that the bearing provided by reception of king pin 18 in bush 17 is disposed beneath the axis of rotation of the road wheel mounted on hub 33, such rotational axis also being that of shaft 34. The magnitude of the loads exerted on such bearing are thus minimized due to the small distance between the bearing and contact area between the tyre and the ground. Further, the steering arm 19 and track rod 21 are also located below the axis afore said, enabling the particular positioning of control rod 22 within spindle 13.

The hub 33 may be as shown in detail in FIG. 2.

Referring now to FIG. 2 of the drawings, there is illustrated an assembly comprising a support member 115 which may, for example, be the end of an axle beam secured by appropriate linkage to a vehicle, which carries a housing 119 rotatably mounting a hub 126. The support member 115 depends downwardly and has at its lower a hollow boss 116 containing bearings 117 mounting a spigot 118 for movement about an axis 141. The spigot 118 is formed integrally with the housing 119.

The housing has an extension 120 at its left hand end which is spigoted at 121 into the housing 119. An annular gear 122 is splined at 123 to the extension 120 and is located axially between the housing 119 and the extension 120.

The housing 119 carries a roller bearing 124 and the extension 120 carries the roller bearing 125 and in these roller bearings 124 and 125 is mounted a rotatable hub and planet carrier 126. This hub comprises two parts, a right hand part 127 and a left hand and cup-shaped part 128. The parts are secured together with studs 129 which also serve to secure a wheel rim supporting member 130 to the hub. The right hand part 127 of the planet carrier carries a number of planet gears, one of which is indicated at 131, the gears being located axially between an integral flange 132 on the part 127 and washer 133 trapped between the parts 127 and 128. The planet gears mesh with the annulus gear 122 and also with a sun gear 134 which is formed at the left hand end of the shaft 135 which carries at its right hand end the inner race 136 of a constant velocity ratio (homo-kinetic) universal joint 114. The sun gear is located radially solely by the joint 114 and the planet gears 131. The left hand end of the hub is sealed by means of the cup-shaped member 128 and a seal 137 engaging the external periphery of the cup-shaped member and carried by a boot 138 secured to the extension 120. The right hand end of the hub is sealed by sealing means indicated generally at 139. The sealing means includes a boot 140 fitting within the housing 119. The outer race 113 of the joint 114 is integral with an input shaft 112.

The wheel supporting member 130 has secured thereto by an adaptor ring, not shown, a rim 143 having a low profile tyre 144.

In this arrangement, drive to the hub takes place from the shaft 110 through the reduction gears 111, the universal joint 114, the epicyclic hub reduction gearing 134, 131 and 122 and via the planet carrier 126. It is to be noted that the steering axis 141 of the sub-assembly passes through the centre 142 of the universal joint and through the right hand bearing 124. The axis also passes through the centre of the tyre correct patch thus giving centre point steering, as hereinbefore referred to, the axis lying in the central plane of the wheel and tyre.

The housing 119, 120 has a fixed brake part 145 integral therewith and a brake pack has alternate discs splined to the part 145 and the member 130.

Liquid lubricant is contained within the housing 119 for lubricating the bearings 124, 125 and the other components therein. A passage 146 leads from the bottom of housing 119 into the boss 116, and conveys lubricant into the boss to fill the space contained thereby and lubricate the steering swivel bearings 117. The bottom of boss 116 is closed by a cover plate 147, and a seal 148 is operative between the top of boss 116 and spigot 118 to prevent escape of lubricant. In use, the boss 116 is filled with lubricant by gravity to ensure adequate lubrication of the bearings 117. This is possible by virtue of the disposition of the bearings 117 wholly below the rotatable hub axis.

The essential features of the invention may also be applied to vehicles incorporating other axle arrangements and suspension systems. By way of example, in FIG. 3 there is illustrated one end of a beam axle 210 supported relative to a vehicle by a leaf spring 209 and having at its end a member 211. A steerable housing 213 is carried on a steering swivel bearing indicated diagrammatically only at 212, the housing 213 being steered by a track rod 215 connected to an extension 214 of the housing at a level below the axis of rotation of a wheel and hub (not shown) supported in the housing 213. The hub is driven from a drive shaft 216. The detail of the hub and associated components may be as shown in FIG. 2, with the steering swivel bearings lubricated from the hub assembly.

I claim:

1. A vehicle wheel mounting assembly comprising a rigid axle beam having at each end thereof a non-steerable element including a steering bearing means, a spindle mounting said non-steerable element on said axle beam for pivotal movement of the non-steerable element about an axis extending transversely of the vehicle, a steerable element supported on said non-steerable element by said steering bearing means and including a rotatable hub for a ground engaging wheel, said steering bearing means being located wholly below the rotary axis of the hub when the assembly is in use, means mounting a steering control element slideably of the axle beam substantially on said transverse axis, a track rod, means operatively connecting the track rod to the steerable element and to the steering control element at a level below said hub rotary axis, and said track rod extending inwardly of the vehicle.

2. An assembly according to claim 1 wherein said steering control element comprises a control rod slideable within the spindle.

3. An assembly according to claim 1 wherein said steerable element and rotatable hub define an enclosure containing lubricant for said bearing means, and there is means providing for supply of lubricant from said enclosure to said steering bearing means.

4. An assembly according to claim 2, wherein said means comprises a passage leading from the bottom of said enclosure and opening into a further enclosure in which said steering bearing means is disposed.

* * * * *